(12) United States Patent
Urhan

(10) Patent No.: US 7,694,299 B2
(45) Date of Patent: Apr. 6, 2010

(54) COMPOSITE TASK FRAMEWORK

(75) Inventor: Tolga Urhan, Mountain View, CA (US)

(73) Assignee: Bea Systems, Inc., Redwood Shores, CA (US)

( * ) Notice: Subject to any disclaimer, the term of this patent is extended or adjusted under 35 U.S.C. 154(b) by 1340 days.

(21) Appl. No.: 11/058,112

(22) Filed: Feb. 15, 2005

(65) Prior Publication Data

US 2006/0184940 A1 Aug. 17, 2006

(51) Int. Cl.
- G06F 9/455 (2006.01)
- G06F 9/46 (2006.01)
- G06F 15/16 (2006.01)
- G06F 11/00 (2006.01)
- G11C 29/00 (2006.01)

(52) U.S. Cl. .......................... 718/100; 718/1; 718/101; 718/106; 709/201; 709/217; 714/2; 714/19; 714/17

(58) Field of Classification Search ................. 718/100, 718/101, 102, 1, 103, 104, 105, 106; 709/201, 709/202, 203, 217, 218, 219; 714/2, 19, 714/15, 20, 51, 716, 764

See application file for complete search history.

(56) References Cited

U.S. PATENT DOCUMENTS

| | | | |
|---|---|---|---|
| 5,630,047 A * | 5/1997 | Wang | ........................... 714/15 |
| 5,852,732 A | 12/1998 | Freund et al. | |
| 5,870,545 A * | 2/1999 | Davis et al. | .................. 709/201 |
| 6,088,659 A * | 7/2000 | Kelley et al. | ................... 702/62 |
| 6,148,323 A * | 11/2000 | Whitner et al. | ............. 718/105 |
| 7,430,740 B1 * | 9/2008 | Molloy et al. | ............. 718/101 |
| 7,451,432 B2 * | 11/2008 | Shukla et al. | ............... 717/106 |
| 2004/0045001 A1 * | 3/2004 | Bryant | ....................... 718/100 |
| 2006/0184940 A1 | 8/2006 | Urhan | |

OTHER PUBLICATIONS

Gokkoca et al. "Design and Implementation of a Distributed Workflow Enactment Service," Proceedings of the Second IFCIS International Conference on Cooperative Information Systems, p. 89-98, Jun. 24-27, 1997.*

Dogac, et al., "Design and Implementation of a Distributed Workflow Management System: METUFlow", 1998, pp. 1-32, Middle East Technical Univeristy (METU), NATO ASI Series F Computer and System Sciences.

* cited by examiner

*Primary Examiner*—Meng-Ai An
*Assistant Examiner*—Abdullah Al Kawsar
(74) *Attorney, Agent, or Firm*—Fliesler Meyer LLP

(57) ABSTRACT

A system, method and media for performing a composite task, comprising: determining an undo task for each subtask in a plurality of subtask for the composite task; performing each one of the plurality of subtasks; performing the associated undo task for each subtask that was performed if the performing of any subtask in the plurality of subtasks fails. This abstract is not intended to be a complete description of, or limit the scope of, the invention. Other features, aspects and objects of the invention can be obtained from a review of the specification, the figures and the claims.

17 Claims, 9 Drawing Sheets

```
public class updateServiceEntryTask extends LocalTask { private ServiceEntry newEntry;

public UpdateServiceEntryTask(ServiceEntry, newEntry) {
        super ("Task for updating service entry",
            Collections.singletonMap("Service",
                newEntry.getName()));
        this.newEntry = newEntry;
    } public void execute() throws Exception {
        ServiceManager.getInstance().updateServiceEntry(newEntry);
    } public void validate() throws Exception {
        ServiceManager.getInstance().
            validateServiceEntryForUpdate(newEntry);
    } public Task computeUndoTask() throws Exception {
        return null;   // no undo task is defined
    }
}

Task myTask = new UpdateServiceEntryTask(newUpdatedEntry);
```

*Figure 2*

```
public class updateEndpointConfigTask extends DistributedTask
{
    private String serviceName;
    private EndPointConfiguration newconfig;

public updateEndpointconfigTask(String serviceName,
        EndPointConfiguration newConfig { super(…);
            this.serviceName = serviceName;
            this.newconfig = newConfig;
    } public void execute(boolean isPrimary) throws Exception { if (isPrimary) {
            ServiceManager().getinstance().
                updateEndPointconfiguration(
                    serviceName, newconfig);
        }
        else {
            TransportManager.getlnstance().
                refreshEnpoint(service);
        }
    }
}
public void beforeDistribute() {
    newConfig = null; // null this out so not distributed.
} public void validate() throws Exception {…} public Task computeUndoTask() throws Exception {…}.
…

Task myupdateTask = new UpdateEndpointConfigTask("service",
                        newConfig);
```

Figure 3

```
Task[] subtasks = new Task[] { myLocalTask,
       myDistributedTaski,
       myOthercompositeTask};

Task myCompositeTask = new CompositeTask("My composite
task",
     propertyMap, subtasks);
```

*Figure 4*

```
public class CreateServiceProviderTask extends LocalTask {
    static class undo extends LocalTask { private String providerName;

public undo(String providerName) {
            this.providerName = providerName;
        } public void execute() throws Exception {
            if
(sm().serviceProviderExists(providerName)){
                    sm().deleteserviceProvider(providerName)
;
        } public void validate() throws Exception { return;
} public Task computeUndoTask() throws Exception {
            return null;
        }
    } private ServiceProviderEntry entry;

public CreateServiceProviderTask(ServiceProviderEntry
        entry) {
            super(…);
            this.entry = entry;
    } public void validate() throws Exception {…}
    public void execute() throws Exception {…} public Task computeUndoTask() throws Exception {
        return new undo(entry.getName());
    }
}
```

COMPOSITE TASK FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is related to the following application:
U.S. application Ser. No. 11/058,120 entitled DISTRIBUTED TASK FRAMEWORK, by Tolga Urhan, filed Feb. 15, 2005, now abandon

FIELD OF THE DISCLOSURE

The present disclosure relates generally to a framework for performing composite and distributed tasks in a distributed computing environment.

BACKGROUND

Propagating a software task to different systems for execution can be difficult without the use of a programming framework. Even so, when tasks are propagated to a large number of remote systems, detecting failure of any one task can be difficult, much less attempting to undo the effects of failed tasks. Another difficulty with distributing tasks arises when a set of tasks needs to be treated as a single task for purposes of undoing any failed tasks. What is needed is a means for tracking tasks that allows for the detection and undoing of failed tasks, whether those tasks are composed of other tasks and/or are distributed.

BRIEF DESCRIPTION OF THE DRAWINGS

FIG. 2 is an illustration of a code sample that defines a local task in accordance to various embodiments.

FIG. 3 is an illustration of a code sample that defines a distributed task in accordance to various embodiments.

FIG. 4 is an illustration of a code sample that instantiates a composite task in accordance to various embodiments.

FIG. 5 is an illustration of a code sample that defines an undo method in accordance to various embodiments.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one.

While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

A task framework provides a programmatic way for units of work to be distributed and performed on one or more computing devices or systems connected by one or more networks or other suitable communication means. At the heart of the framework are tasks. In the most general sense, a task is capable of performing a unit of work, potentially in parallel or simultaneously with other tasks. By way of a non-limiting illustration, a task can update a piece of configuration data, modify a runtime state, create J2EE artifacts, update a database, perform compute-intensive calculations, collect statistics in a distributed-manner and communicate them back to another process, or perform any other kind of action(s).

In one embodiment, there are three types of tasks. A local task can perform its work on a local or "primary" computing device or system (hereinafter "system"). That is, a local task is not distributed to other systems. A distributed task can perform its work on one or more "secondary" systems (e.g., in a cluster) by way of its distribution to these systems. A composite task includes a plurality of subtasks. Each subtask is either a local, distributed or composite task. There is no limit to the number of subtasks in a composite task or how deeply nested composite subtasks may be. In one embodiment, a composite task's subtasks are executed sequentially. In another embodiment, a composite subtask's can be performed partially or substantially in parallel. Although distributed tasks imply parallelism, any type of task can support concurrency/parallelism. For example, a task can spawn one or more processes or threads to perform its work. Even if a task is a single process from the standpoint of a software developer, parts of the task may be performed in parallel at the hardware level via processor-level threads or other optimizations. Furthermore, even though a local task is not distributed, it may still have a distributed effect. For example, this can occur when a task modifies a information that is replicated.

Figure 1:
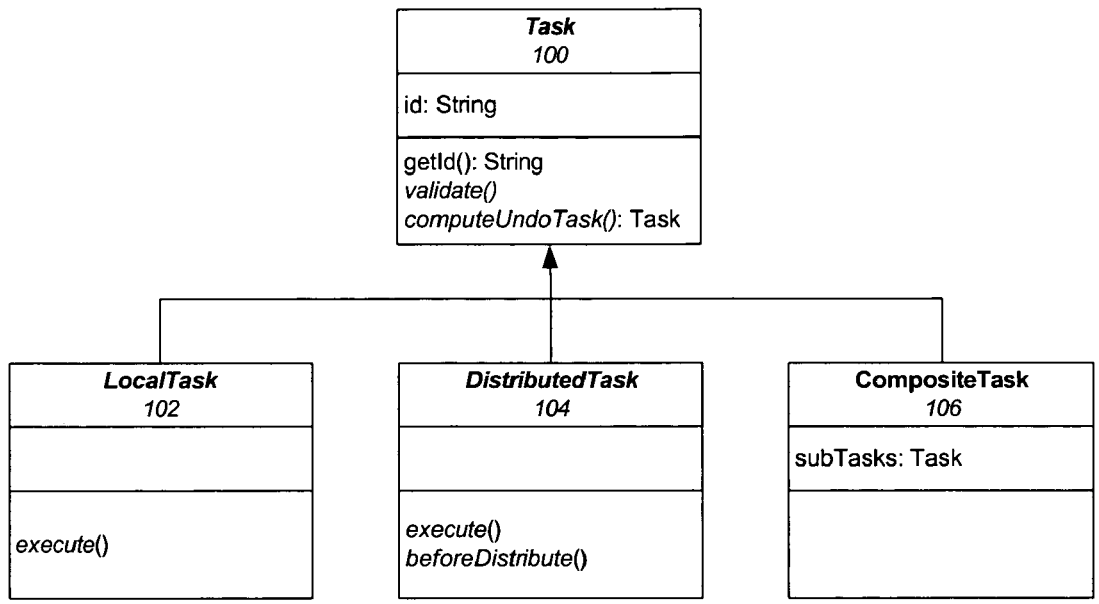
FIG. 1 illustrates a task class hierarchy in accordance to various embodiments.

By way of a non-limiting illustration, a task can be realized as an object in an objected-oriented programming language wherein the task object has a structure and behavior that are compatible with a task manager. In one embodiment, a task is a Java® object that implements a subtype of a Task interface. (Java is registered trademark of Sun Microsystems, Inc.) FIG. 1 illustrates a task class hierarchy in accordance to various embodiments. Italic typeface is used to indicate abstract classes and methods. The Task abstract class 100 has a task identifier id and an associated getId method to identify the particular instances of the task. In one embodiment, each task object has a unique identifier. The Task class also specifies two abstract methods: validate and computeUndoTask which are to be implemented by subclasses. In one embodiment, the implementation of the validate method can verify that the task execution makes sense (e.g., will probably not fail). The implementation of the execute method is where the actual task execution logic is defined. Invoking an execute method on a task causes the task to be performed.

LocalTask 102 and DistributedTask 104 are abstract classes which inherit from the Task class and are sub-classed in order to define a task local and distributed tasks, respectively. The LocalTask and DistributedTask classes specify an execute abstract method which is called to initiate the performance of a task. The DistributedTask class also defines a beforeDistribute method which can be invoked before the task is distributed to other systems. CompositeTask 106 is a concrete class for composite tasks that does not require subclassing. It includes a list or collection of tasks called subTasks which are performed as part of performing the CompositeTask. In various embodiments, an instance of a concrete task is created and provided to a task manager for execution. In one embodiment, the instance is validated before it is performed by invoking its validate method. In one embodiment, if the instance's execute method indicates failure of the task, an undo task can be invoked. Details of task execution are provided below.

FIG. 2 is an illustration of a code sample that defines a local task in accordance to various embodiments. In one embodiment, a local task is performed with a task manager on a system local to the task manager (e.g., on the system on which the task manager is executing). In this example, a local task UpdateServiceEntryTask is defined by extending the LocalTask abstract class. In one embodiment, the constructor for LocalTask takes a descriptive label and name-value pairs in the form of a map. The label and name-value pairs are strictly for illustrative purposes and do not affect the execution of the task in any way. Implementations are provided for the execute, validate and computeUndoTask methods. In this example, the validate method verifies that an entry that will be created by the execute method does not already exist, that the values are legal, and so on. The implementation of execute method uses creates a new service entry. For the sake of clarity the computeUndoTask method returns null indicating that there is no undo task.

A distributed task is performed on a primary system and one or more secondary systems to which it is distributed. In one embodiment, a distributed task object is physically distributed via a Java Message Service (JMS) topic to the secondary systems and then performed locally on each. In one embodiment, a distributed task is sent to secondary systems only after it has successfully been performed on the primary system —if it fails during validation or execution, the task is not distributed. In yet a further embodiment, validation and computation of the undo task is performed only on the primary system. In aspects of these embodiments, execution of a distributed task on the primary system is synchronous from a caller's perspective, whereas the execution on the secondary systems happens in the background. Therefore the caller that initiates the performance of a task on the primary system does not need to wait for the tasks on the secondary systems finish execution.

FIG. 3 is an illustration of a code sample that defines a distributed task in accordance to various embodiments. In one embodiment, a distributed task class defines at least two methods: execute and beforeDistribute. The execute method performs the main task functionality. In aspects of these embodiments, a distributed task can behave differently on primary and secondary systems. The execute method can use one or more parameters to tailor its execution for each type of system. For example, in a clustered domain, configuration data is updated on the primary system, whereas other runtime structures (such as routers) exist on secondary systems must be updated there. In an aspect of this embodiment, the execute method is passed a boolean argument isPrimary which is true only on the primary system. In one embodiment, the beforeDistribute method is invoked on the primary system after executing the task successfully but before the task is serialized and replicated to secondary systems. This method provides the opportunity to null-out any member fields that need not be distributed to the secondary system. In this example the "newconfig" member is nulled out because it is not needed on secondary systems.

A composite task is a collection of subtasks that can be executed in sequence. A subtask can be a local task, a distributed task, or another composite task. In one embodiment, the performance of a composite task is handled by a task manager module which can perform subtasks in a sequential order. The failure of a sub-task can cause the composite task to fail. A composite task is executed locally on a primary system if all of its subtasks (recursively) are local tasks. Otherwise (if it contains at least one distributed task) then it is executed in a distributed manner. In the latter case, all the subtasks are performed on the primary system, but only distributed subtasks are performed on secondary systems.

A composite task can be created by using the constructor of the CompositeTask concrete class. FIG. 4 is an illustration of a code sample that instantiates a composite task in accordance to various embodiments. In one embodiment, a default implementation of the validate method in CompositeTask class validates all of its subtasks (e.g., recursively). If this default behavior is not desired, the CompositeTask can be subclassed and provided a different validate method. In one embodiment, the default computeUndoTask method for a composite task is constructed dynamically as the subtasks are executed.

A task may provide an undo task that undoes the effects of its execution. In one embodiment, an undo task can undo the effects of execution whether the original execution was successful or not. For example, an undo task may be performed after a task leaves the system in an inconsistent state. Thus, the undo task should be resilient and not be surprised in case of such inconsistencies. It should be implemented so that it tries to rollback everything the original task has done in a best effort manner. In one embodiment, an undo task is obtained and durably stored by a task management module just before the original task is peformed by calling task's computeUndoTask method. A null return value indicates that no undo task exists and therefore the task cannot be undone once executed. In one embodiment, a software developer specifies the undo task for objects derived from LocalTask and DistributedTask. A local task may have a distributed undo task and vice versa. The undo task for CompositeTask can be determined automatically by the system.

FIG. 5 is an illustration of a code sample that defines an undo task and an undo method in accordance to various embodiments. The undo task subclasses LocalTask and provides an execute method for performing its undo logic. In this example, the execute method checks whether the service provider entry was indeed created, and deletes it only if it actually exists. This means it does not cause any exceptions if the service did not exist at all. In one embodiment, the undo task provides empty computeUndoTask and validate methods. The undo task in this example is provided for a local task class, CreateServiceProviderTask. This task's computeUndoTask method returns an instance of the undo task.

Figure 6:
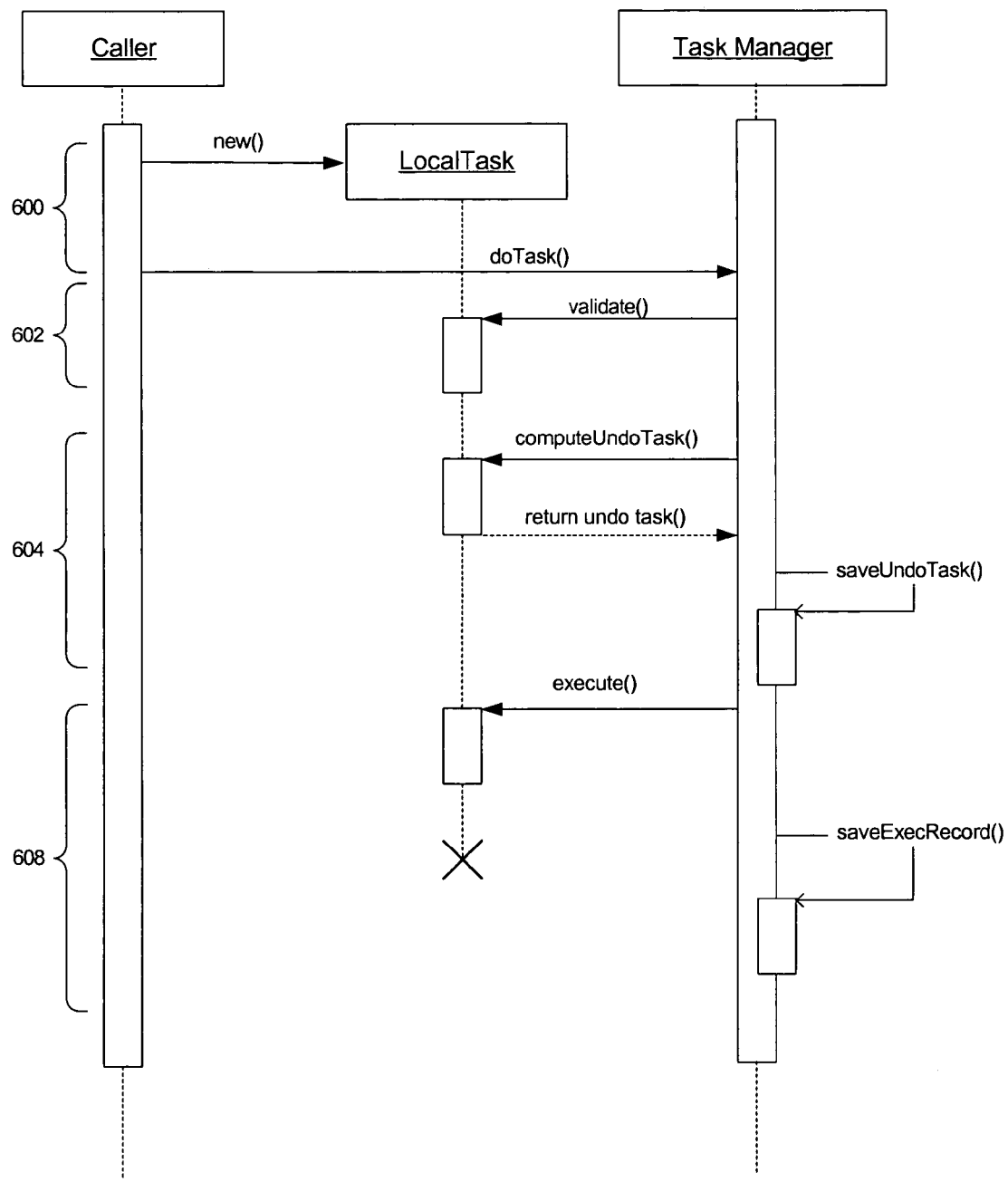
FIG. 6 is an illustration of local task execution in accordance to various embodiments.

FIG. 6 is an illustration of local task performance in accordance to various embodiments. In one embodiment, a client managed Java® bean (MBean) or other caller instantiates a task and provides it to a task manager for execution. The task manager then invokes methods of the task. This figure details the interaction between the task manager and a local task. In phase 600, the execution of a task starts with the client creating a task instance and passing it to the task manager for execution. The task manager invokes the validate method for the task in phase 602. In one embodiment, the execution is foregone and an exception is returned to the caller (not shown) if the validation method fails. If validation succeeds, the computeUndoTask method is invoked (phase 604). This method returns an undo task if there is one. Otherwise it returns null. The undo task can be stored for possible invocation later. Finally, the task's execute method is invoked (phase 606), which performs the task. The execution falls if there is an exception and the saved undo task is invoked (not shown). In either case, a record of the task execution can be persisted.

Figure 7:
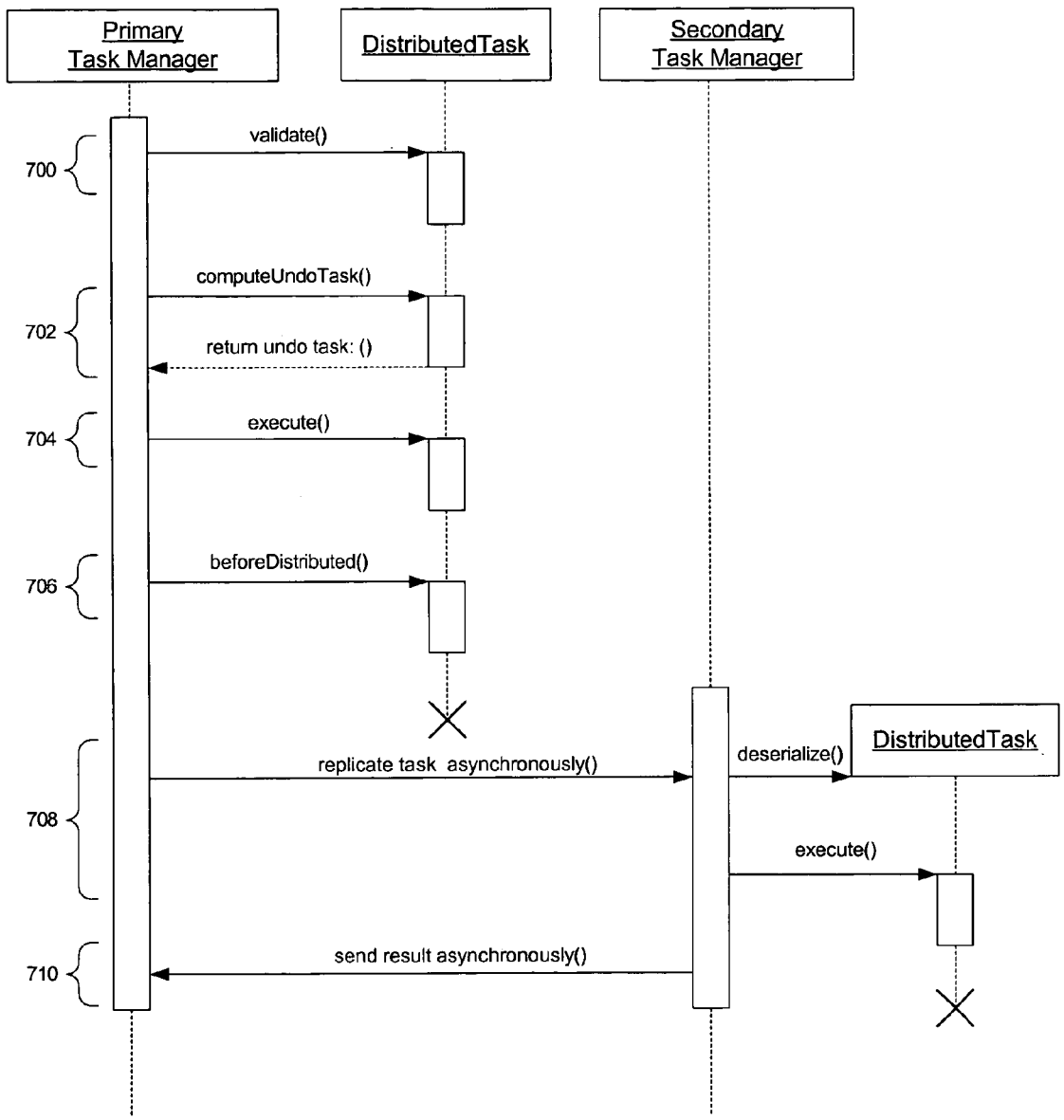
FIG. 7 is an illustration of distributed task execution in accordance to various embodiments.

FIG. 7 is an illustration of distributed task execution in accordance to various embodiments. In the figure, primary task manager refers to the task manager instance on the primary system, and secondary task manager refers to an instance on a secondary system. In one embodiment, distributed task performance begins on the primary system and is propagates to secondary systems if it succeeds on the primary system. This figure shows the calling sequence on both the primary system and a secondary system. In the figure the client and the calls to saveUndoTask and saveExecRecord methods are omitted for clarity.

Task performance starts on the primary system by invoking the validate and computeUndoTask methods. If validation fails, the execution stops(phase 700). If computeUndoTask returns an undo task it is saved for future undo operations (phase 702). The isPrimary parameter is passed in by the primary task manager as true as part of invoking the task's execute method (phase 704). This parameter can be used by the method to perform different actions on the primary and the secondary systems. In one embodiment, if the execute method fails the distribution of the task is foregone. Otherwise, the task's beforeDistribute method is invoked by the primary task manager in one embodiment (phase 706). This affords the task an opportunity to perform any initialization or preliminary actions before the task is distributed (e.g., nulling-out any member fields that need not be transmitted to the secondary systems). The task is then serialized and sent to all the secondary systems via a JMS topic (phase 708) and deserialized on the secondary task manager. The secondary task manager invokes the task's execute and the result of the execution is sent to the primary system via a JMS queue (phase 710).

Figure 8:
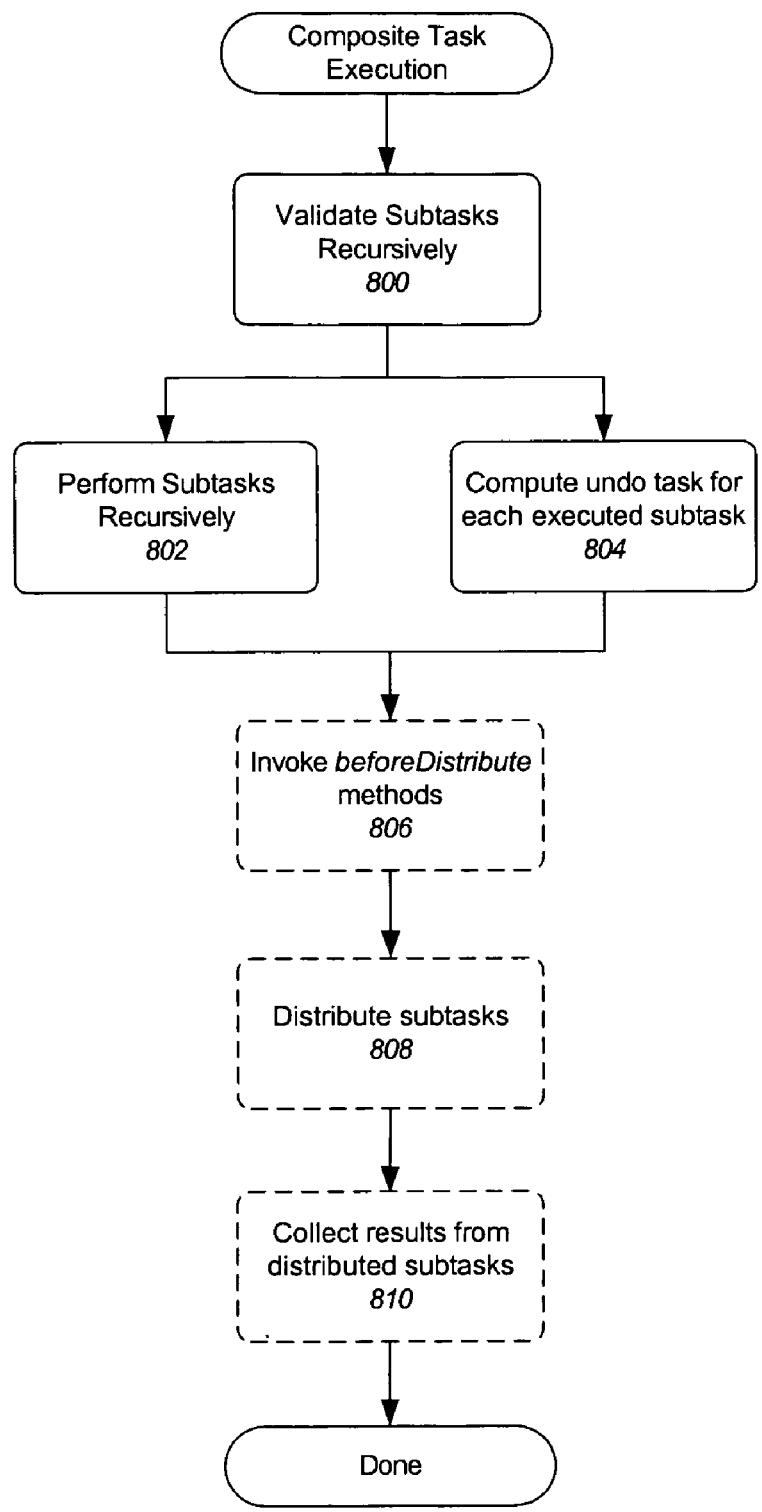
FIG. 8 is a flow chart illustration of composite task execution in accordance to various embodiments.

FIG. 8 is a flow chart illustration of composite task execution in accordance to various embodiments. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In step 800 the composite task is validated. In one embodiment, the implementation of CompositeTask iterates over all the subtasks recursively and validates them. If any subtask validation fails, the execution of the composite task fails, too. If a different validation behavior is needed the CompositeTask can be subclassed and the validate method redefined. The task manager iterates over all the subtasks (recursively) and executes each subtask (step 802) on the primary system. As each subtask is performed (or before or after reach subtask is performed), the undo task for each subtask can be obtained (step 804). In one embodiment, the undo task for the composite task is another composite task that contains all of the obtained undo tasks in reverse order. In aspects of these embodiments, if a task with no undo task has been performed all of the previous undo tasks that have been obtained are discarded. If the execution of a subtask on the primary system fails, the undo task can be performed (not shown).

If a composite task contains at least one distributed task the distributed task needs to be disseminated to one or more secondary systems. In one embodiment, distribution occurs after all the subtasks have executed on the primary system successfully. Before the distribution occurs the local subtasks which need to be distributed can be removed from the composite task. The beforeDistribute method of each distributed subtask is called (step 806) and each distributed task is serialized and forwarded to a secondary system for execution (step 808). Then the results of performing each distributed subtask are collected in step 810.

In various embodiments, as tasks are executed (or undone) an execution record can be saved that contains detailed information about the execution. By way of illustration, this record can include one or more of the following information for both normal and undo execution:

Date (undo) task is executed.

Name of the user that executed this task.

Displayable information about the task (such as its label, properties etc).

The result of the execution.

Figure 9:
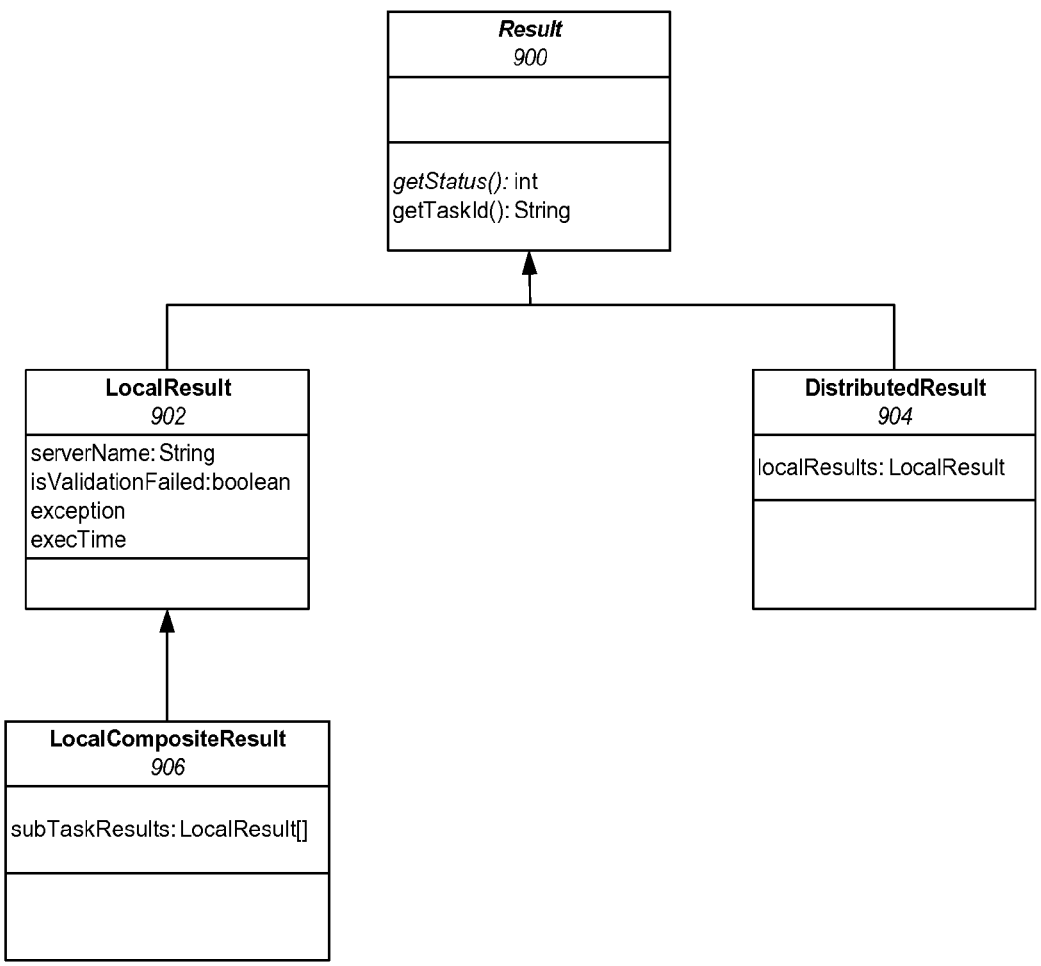
FIG. 9 illustrates a result class hierarchy in accordance to various embodiments.

FIG. 9 illustrates a result class hierarchy in accordance to various embodiments. Italic typeface is used to indicate abstract classes and methods. In one embodiment, the result of the execution is stored in an object that implements the Result interface 900. Depending an the type of the task (Local/Distributed/Composite) a different result object can be used. If the task is local, the result is an instance of LocalResult 902. The overall status of a distributed task depends on the status of individual executions of that task on different servers. Likewise the status of a composite task depends on the status of subtasks that make it up. If the task is distributed, the result is an instance of DistributedResult 904. The DistributedResult includes a mapping from server/system names to LocalResults. If the task composite with no DistributedTasks, the result is a LocalCompositeResult 906 (which is an instance of LocalTask). Otherwise it is an instance of DistributedResult with mapping from server names to LocalCompositeResult objects.

The Result interface 900 implemented by each result class specifies an abstract getStatus method which each subclass implements. In one embodiment, the returned status can indicate failure, success or an unknown result. The status of a task is "success"only if the task has executed successfully everywhere it is supposed to execute. For a local task this means that the task was successfully executed on the only primary system. For a distributed task it means the task has executed successfully on the primary and all secondary systems. For a composite task it means that all of the tasks it contains have successfully executed on all of the systems to which they were targeted. The status of a task is "failed" if it is known that the task has failed on at least one system where it is targeted. The status of a task is "unknown" if it is not known whether the task has failed or succeeded. By way of example, this can occur if a distributed or composite task has not yet executed on all systems.

Various embodiments may be implemented using a conventional general purpose or specialized digital computer(s) and/or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of conventional component circuits, as will be readily apparent to those skilled in the art.

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for performing a composite task, comprising:
    determining, via one or more processors, an associated undo task for at least one subtask in a plurality of subtasks for the composite task, wherein a subtask of the plurality of subtasks is one of a local subtask, a distributed subtask, and a composite subtask, and wherein the at least one subtask is a distributed task that is associated with a local undo task;
    performing at least one of initializing one or more data items associated with the at least one subtask, and unassociating one or more data items associated with the at least one subtask;
    performing one or more subtasks in the plurality of subtasks, wherein the performing of the one or more subtasks includes a performing of the at least one subtask, which is a distributed subtask, on a remote task manager;
    performing the associated local undo task for the at least one subtask if the performing of any of the one or more subtasks fails.

2. The method of claim 1 wherein:
    if the performing of any subtask in the plurality of subtasks fails, forgoing the performing of any remaining subtasks.

3. The method of claim 1 further comprising:
    performing an undo task for a subtask undoes one or more execution effects of performing the subtask.

4. The method of claim 1, wherein the performing each subtask in the plurality of subtasks includes:
    performing a local subtask in the plurality of subtasks on a local task manager.

5. The method of claim 1, wherein:
    the at least one subtask is a composite subtask that is a collection of subtasks.

6. The method of claim 1, further comprising:
    executing the plurality of subtasks in a sequential order.

7. The method of claim 1, further comprising:
    validating the composite task by validating each one of the plurality of subtasks.

8. The method of claim 1, further comprising:
    saving the status of the performing of each one of the plurality of subtasks.

9. A computer storage medium having instructions stored thereon to cause a system to:
    determine an associated undo task for at least one subtask in a plurality of subtasks for the composite task, wherein a subtask of the plurality of subtasks is one of a local subtask, a distributed subtask, and a composite subtask, and wherein the at least one subtask is a distributed task that is associated with a local undo task;
    perform at least one of initializing one or more data items associated with the at least one subtask, and unassociating one or more data items associated with the at least one subtask;
    perform one or more subtasks in the plurality of subtasks, wherein the performing of the one or more subtasks includes a performing of the at least one subtask, which is a distributed subtask, on a remote task manager;
    perform the associated local undo task for the at least one subtask if the performing of any of the one or more subtasks fails.

10. A system for performing a composite task, comprising:
    one or more processors;
    a plurality of subtasks for the composite task wherein a subtask is one of: a local subtask, a distributed subtask, and a composite subtask;
    a first task manager capable of:
    determining, via one or more processors, an associated undo task for at least one subtask in a plurality of subtasks for the composite task, wherein the at least one subtask is a distributed task that is associated with a local undo task;
    performing at least one of initializing one or more data items associated with the at least one subtask, and unassociating one or more data items associated with the at least one subtask;
    performing one or more subtasks in the plurality of subtasks, wherein the performing of the one or more subtasks includes a performing of the at least one subtask, which is a distributed subtask, on a remote task manager;
    performing the associated local undo task for the at least one subtask if the performing of any of the one or more subtasks fails.

11. The system of claim 10 wherein:
    if the performing of any subtask in the plurality of subtasks fails, forgoing the performing of any remaining subtasks.

12. The system of claim 10 wherein:
    performance of an undo task for a subtask undoes one or more execution effects of performing the subtask.

13. The system of claim 10, further comprising:
    a second task manger capable of performing a distributed subtask in the plurality of subtasks; and wherein the second task manager is on a different host from the first task manager.

14. The system of claim 10, wherein:
the at least one subtask is a composite subtask that is a collection of subtasks.

15. The system of claim 10 wherein:
the plurality of subtasks are executed in a sequential order.

16. The system of claim 10, wherein the first task manager is capable of further performing:
validating the composite task by validating each one of the plurality of subtasks.

17. The system of claim 10, wherein the first task manager is capable of further performing:
saving the status of the performing of each one of the plurality of subtasks.

* * * * *

UNITED STATES PATENT AND TRADEMARK OFFICE
CERTIFICATE OF CORRECTION

| | | |
|---|---|---|
| PATENT NO. | : 7,694,299 B2 | Page 1 of 1 |
| APPLICATION NO. | : 11/058112 | |
| DATED | : April 6, 2010 | |
| INVENTOR(S) | : Tolga Urhan | |

It is certified that error appears in the above-identified patent and that said Letters Patent is hereby corrected as shown below:

On the Title page, under "Other Publications", in column 2, line 7, delete "Univeristy" and insert -- University --, therefor.

On the Title page, item (57), under "Abstract", in column 2, line 3, delete "subtask" and insert -- subtasks --, therefor.

In column 1, line 18, delete "abandon" and insert -- abandoned. --, therefor.

In column 2, line 46, after "modifies" delete "a" and insert -- an --, therefor.

In column 4, line 4, delete ""newconfig"" and insert -- "newConfig" --, therefor.

In column 4, line 38, delete "peformed" and insert -- performed --, therefor.

Signed and Sealed this
First Day of March, 2011

David J. Kappos
*Director of the United States Patent and Trademark Office*